Figure 1:
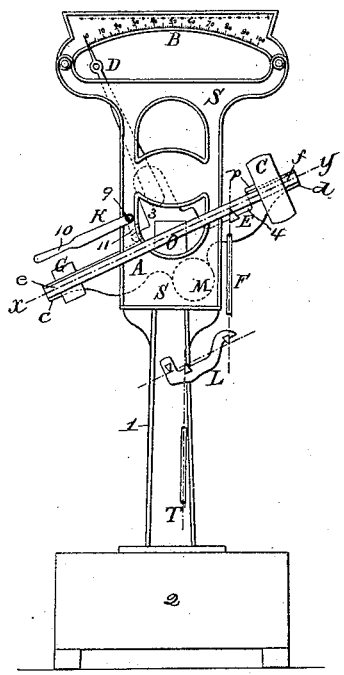

(No Model.) 2 Sheets—Sheet 1.

E. ROCHE.
WEIGHING MACHINE.

No. 409,302. Patented Aug. 20, 1889.

Attest:
Geo. H. Graham
A. E. F. Hansmann

Inventor:
Emile Roche
by Joseph Lyons
Attorney (No Model.)  2 Sheets—Sheet 2.

E. ROCHE.
WEIGHING MACHINE.

No. 409,302.  Patented Aug. 20, 1889.

Witnesses
F. T. Chapman
Fannie Wise.

Inventor
Emile Roche.
By his Attorney
Joseph Lyons.

UNITED STATES PATENT OFFICE.

EMILE ROCHE, OF RHEIMS, FRANCE.

WEIGHING-MACHINE.

SPECIFICATION forming part of Letters Patent No. 409,302, dated August 20, 1889.

Application filed September 12, 1887. Serial No. 249,478. (No model.) Patented in France January 22, 1887, No. 180,990.

*To all whom it may concern:*

Be it known that I, EMILE ROCHE, of Rheims, France, have invented certain new and useful Improvements in Weighing-Machines, (for which I have received Letters Patent in France, January 22, 1887, and numbered 180,990,) of which the following is a specification.

This invention has reference to that class of weighing-instruments known as "pendulum-scales;" and its primary object is to increase the useful range of the graduations of the scale and discard those graduations which rapidly decrease as the indicated weight increases. In weighing-machines of this class the pivoted weight is pendent in its normal position, and when moved around the pivot toward the horizontal the force required to effect such movement increases directly as the tangent of the arc through which the weight travels. In weighing-machines of this character the graduation of the scale is produced by first drawing a tangent to the arc of the scale-plate, then determining empirically the length of that portion of the tangent which corresponds to the unit of weight, and then dividing the whole useful portion of the tangent into parts of such determined length. Each successive division upon the tangent then corresponds to an increment of a unit of weight, and the subdivisions of this gradution correspond to fractions of units of weight. From the pivot of the pendulous weight radii are then drawn to the divisions upon the tangent, and the points where these radii intersect the curved scale-plate are marked upon the latter, and henceforth constitute the practical graduated scale-plate of the weighing-machine. In the vicinity of the zero-point the graduations are comparatively wide, and fractions thereof are easily marked or estimated; but as the graduations recede from the zero-point they become smaller, and finally so small that they cannot practically and with any degree of accuracy be subdivided. Thus only a short length of the scale-plate is available for the purposes of the weighing-machine, and this constitutes one of the defects inherent in machines of this character. I overcome this defect by overbalancing the pendulum-weight until its normal position is at an angle to and away from the vertical plane of its pivot a distance equal to its travel to the other side of such plane; and by this construction I am enabled to obtain a long range of movement of the index needle or finger while still confined to the larger graduations—that is, I utilize only such portions of the travel of the pendulum as can be indicated on a curved scale-plate by graduations that do not perceptibly decrease in spacing as the weight increases.

It is often desirable to weigh liquids and other articles requiring a suitable receiving-vessel when on the weighing-machine. With pendulum-scales as heretofore constructed it was necessary to weigh the receptacle when empty, and also when containing the liquid or other article, and then to ascertain the weight of the contained article by computing the difference between the two weights indicated. In such operation errors frequently occurred.

In weighing-machines constructed according to my invention there is a tare-weight arranged to counterbalance any vessel placed on the platform or pan, so that the index-needle may be returned to the zero-point before the article to be weighed is placed in said vessel, and then the operation of weighing may be proceded with in the same manner as with articles requiring no receiving-vessel, thus avoiding calculation and incidental errors.

I may embody my invention in a variety of apparatus, and have shown it applied to platform-scales; but I am not confined to any particular form of scales or apparatus, as it is evident that one skilled in the art could readily change the constructions shown without departing from the spirit of the invention.

Figure 2:
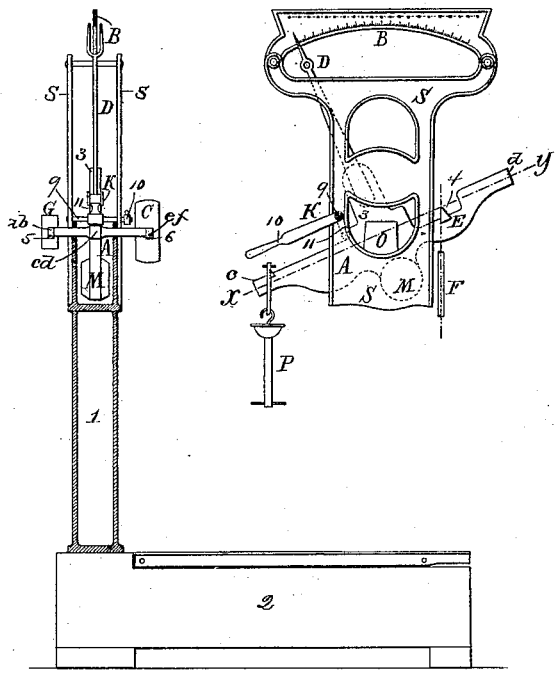

In the annexed drawings, forming part of this specification, Figure 1 is a front elevation of a platform-weighing machine with the improvements applied, and portions of the connections between the platform and the scale-beam indicated in diagram by dotted lines. Fig. 2 is a side elevation of the same with the post or standard in section and the scale-beam in a horizontal position. Figs. 3 to 6, inclusive, are detail views of the upper part of the standard, showing modifications of the construction shown in Figs. 1 and 2. Fig. 7 is a perspective view of the improved scale-beam detached from the standard and showing a portion of the graduated scale-plate.

Referring to the drawings there is a standard 1, mounted on one end of a box-frame 2, constituting the base of the weighing-machine, and inclosing a suitable platform mechanism, which is not here shown, as it forms no part of the invention, and may be of any ordinary or approved construction. Attached to and projecting above the standard 1 is a frame S, formed of two skeleton plates partially inclosing a scale-beam A and suitably bolted together and to the standard. This scale-beam, as shown, is composed of a central or main beam $c\,d$, and two side beams $a\,b$ and $e\,f$ on opposite sides of the main beam and connected to the latter by end pieces $g$ and $h$, which may be integral with the beams or secured thereto by screws or otherwise.

The main beam $c\,d$ has a central upwardly-projecting post 3, forming an integral part thereof, and carrying the lower end of an index needle or finger D, which latter is arranged at right angles to the beam, as shown. The entire scale-beam is pivotally supported on knife-edges formed on a prism O, projecting through the main beam $c\,d$, and to both sides thereof directly below the index-finger. These knife-edges are supported in bearings on top of the standard 1, and covered by the usual castings $O'$; but as such bearings are of common and well-known construction the details are not shown in the drawings.

Directly beneath the knife-edges O the main beam $c\,d$ is provided with an enlargement or boss M, which serves as a pendulum-weight, as will hereinafter more fully appear, and may be formed integral with the said beam, or may be formed of one or more parts and be attached to the said beam in any suitable manner. In fact, any means whereby the center of gravity of the beam is carried below the knife-edges may be used.

It will now be evident that a force applied at either side of the plane of the pivot will tend to oscillate the scale-beam, together with the boss M, and that the latter will oppose such movement in a manner well understood. At one side of the knife-edge or pivot O the beam $c\,d$ is provided with a depression 4, in which is arranged a knife-edge E, mortised into said beam and having its edge uppermost and in the same horizontal plane as the lower edges of the knife-edge prism O. This knife-edge E serves as a bearing for a rod F, which in turn is connected to a lever L, to which motion is imparted through a rod T from the platform mechanism.

The connections between the platform and scale-beam form no part of my invention and are common and well understood, and hence are only diagrammatically indicated, and may be changed to suit the various styles of scales to which my invention is applicable.

The side beam $a\,b$ carries an adjustable weight G, consisting of a block with a central aperture 5 for the passage therethrough of the said beam, and a set-screw $q$ entering said aperture and serving to hold the block on the beam at any desired adjusted position.

The block G, I designate a "tare-weight." It is, as its construction shows, movable along the side beam $a\,b$, and serves the purpose of counterbalancing without actually determining the weight of a vessel or receptacle placed upon the platform. To accomplish this, the tare-weight is moved toward the left-hand end of the side beam $a\,b$ until the pointer or needle coincides with the zero-mark on the scale-plate which marks the position of equilibrium of the beam.

The other side beam $e\,f$ is provided on its upper surface with a series of notches marked 0, 1, 2, &c., and carries a cursor C, formed with a central opening 6, through which the beam extends, and with a tooth $p$, arranged to engage in the notches in the beam. The opening 6 is sufficiently large to permit the lifting of the cursor to disengage the tooth from the notch, after which the said cursor may be moved to any desired position on the beam and there held by allowing the tooth to engage a notch.

It will be observed that the zero position of the cursor is on the same side of the pivot-point of the scale-beam as is the knife-edge E, and that consequently at the zero-point the cursor acts in unison with the weight on the platform; but it is evident that as the cursor is moved toward the left it will tend less and less to assist the weight on the platform, and after passing the knife-edges on prism O will positively oppose the weight on the platform. For equal divisions of the side beam $e\,f$ the effect of the cursor is equal, and these divisions are made to correspond to the unit of weight (pound, kilogram, &c.) placed upon the platform.

The upper edges of both the side beams are in the plane of the knife-edges O and E, as such relative positions of the parts insures greater accuracy in the action of the weight G and the cursor C than if they were otherwise arranged.

Assuming that the parts are all in equilibrium and adjusted to weigh any article within the range of the index, then an article to be weighed is placed on the platform and its weight immediately moves the scale-beam from its normal position. This movement, however, is opposed by the action of the weight M until the parts are again in equilibrium — that is, when the article to be weighed is balanced by the said pendulum-weight M. The needle or finger D will then point to some one of the divisions on the scale-plate B and indicate the weight of the said article placed on the platform of the scales. When the weight of the article exceeds the limit of the index, the cursor C is moved a space equal to one or more notches in the side beam $e\,f$. These notches are so spaced that the movement of the cursor from one notch to the other will be equivalent to the weight indicated by the highest amount on the index.

It has been explained that, as the cursor C at its zero position is on the same side of the scale-beam pivot as the point of application of the load to be weighed, it acts in conjunction therewith, and when moved toward said pivot its action is negative—that is, the load to be counterbalanced by the pendulum is reduced an equivalent amount, as will be evident. When, however, the cursor is moved beyond the scale-beam pivot, its effect is positive and its weight is added to that of the pendulum in balancing the load. Thus it will be seen that the scale is automatic in its action in all points except in the preliminary adjustment for tare and in the movement of the cursor.

In Fig. 7 I have shown, on an enlarged scale, the scale-plate B, with the needle D in the position assumed when the pendulum is in the vertical plane of the beam-pivot, thus bisecting the arc of the index. It will be evident that fractional parts of units may be indicated with equal facility and legibility throughout the index, and that the extent of such legible index is materially increased by utilizing the movement of the pendulum to each side of the vertical plane of the pivot instead of to one side thereof only.

Figure 3:
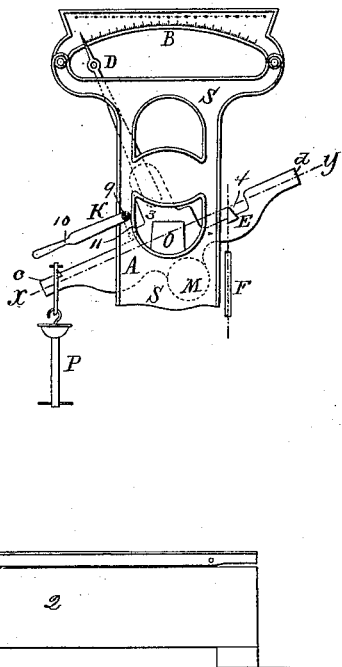

In Fig. 3 the scale-beam is shown composed of the central or main beam $c\ d$ alone, the two side beams and their sliding weights being omitted. On the end of the scale-beam opposite that to which the load is applied is a pendent weight-pan hung on a suitable knife-edge bearing, and which pan may be weighted to normally counterbalance the pendulum M and maintain the beam in an inclined position, as shown, and which may also receive tare-weights and other weights of suitable denomination when the weight of the load exceeds the limit of the scale-plate.

Figure 4:
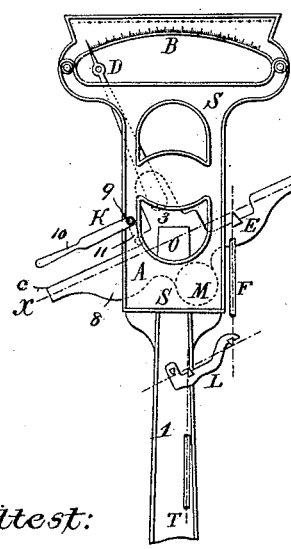

In Fig. 4 I have shown a scale-beam that is entirely automatic. In this instance the central or main beam $c\ d$ alone is used, and the pendulum-weight is counterweighted on the side of the pivot opposite the bearing E by the enlargement 8, so that the normal position of the beam is inclined as in the hereinbefore-described forms. In this form, however, the weighing capacity of the scale is limited by the range of the scale-plate, as no means are provided for applying additional counter-weights.

Figure 5:
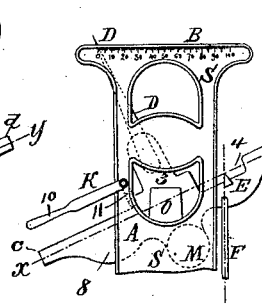

In Fig. 5 I have shown the scale B forming an integral part of the top of the frame-plates S. In this instance the scale is horizontal instead of curved, and the needle terminates in a rather fine point to facilitate the reading of the scale.

Figure 6:
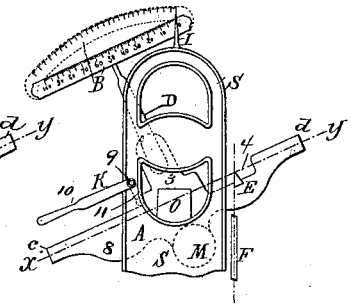
Figure 7:
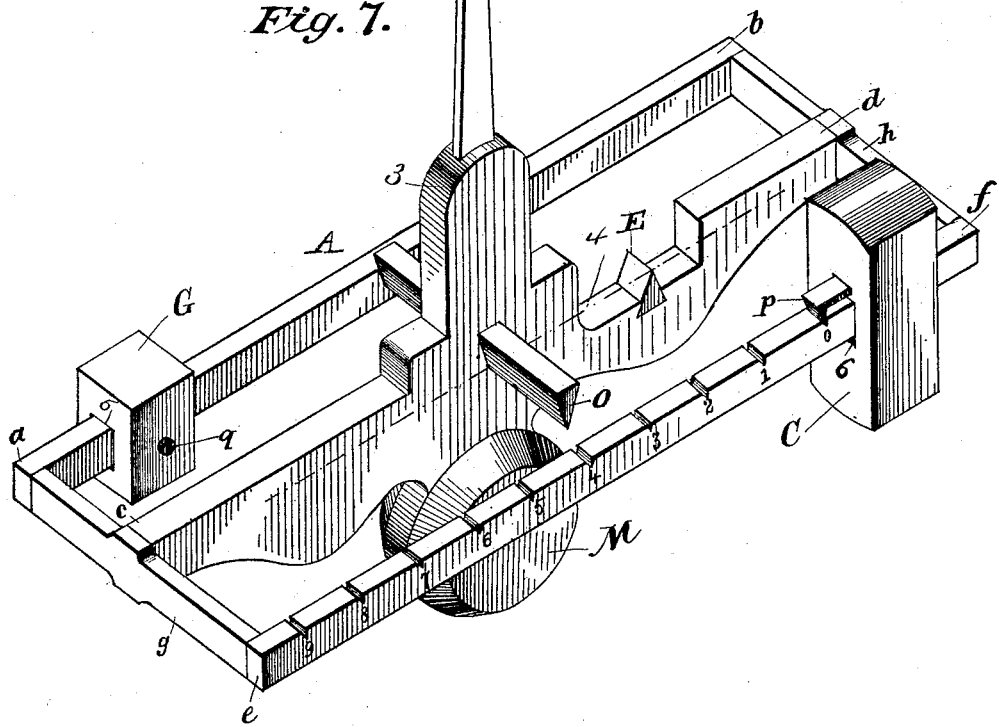

In Fig. 6 I have shown the scale-plate B, either straight or curved, as indicated, attached directly to and moving with the needle D, while an additional fixed needle I is mounted on top of the plate S, so that as the scale-plate moves with the scale-beam the needle I will indicate the division of the scale-plate at which it comes to rest, and so show the weight of the load.

In both Figs. 5 and 6 I have shown the scale-beam constructed the same as in Fig. 4; but it is evident that the peculiar forms of scale-plates may be used with any of the other forms of scale-beam.

In order to quickly bring the scale-beam and needle D to a state of rest and prevent a continued oscillation thereof, I provide a stop K, which consists of a short shaft 9, journaled in the skeleton plates S, and provided with a handle 10, exterior to said plates, and a short angle-arm 11 (shown in dotted lines) in the path of the travel of the main beam $c\ d$.

It will be seen from the drawings that when the handle 10 is upright the arm 11 will be out of contact with the beam, and may be moved to any position to stop the oscillation of the latter, and then may be moved slowly out of contact with the beam to allow it to assume a state of equilibrium.

Having now fully described my invention, what I claim is—

1. In a weighing-machine, the combination of a scale-beam, the pendulum-weight thereon counterweighted to normally assume an inclined position when in the condition of equilibrium, with a pointer and scale-plate for indicating positions of the beam on either side of the horizontal, substantially as described.

2. In a weighing-machine, the combination of a pendulum-scale beam weighted to normally assume an inclined position when in the condition of equilibrium, with a tare-weight movable upon the beam, and an index and scale-plate, substantially as described.

3. In a weighing-machine, the combination of a pendulum-scale beam weighted to normally assume an inclined position when in a condition of equilibrium, with a weight movable upon said beam to both sides of the pivot of the latter, and an index and scale-plate for indicating positions of the beam on either side of the horizontal, substantially as described.

4. In a weighing-machine, the combination of a pendulum-scale beam weighted to normally assume an inclined position when in a condition of equilibrium, with a tare-weight movable on the beam, an index and scale-plate for determining disturbing weights, and a cursor on the scale-beam, substantially as described.

5. In a weighing-machine, the combination of a pendulum-scale beam extended on both sides of its pivot-point and composed of a main beam and two side beams and weighted to normally assume an inclined position, with a sliding tare-weight on one side beam, a cursor on the other side beam, and an index and scale-plate for indicating positions of the scale-beam on either side of the horizontal, substantially as described.

In testimony whereof I have signed my name to this specification in the presence of two subscribing witnesses.

EMILE ROCHE.

Witnesses:
JEAN TRIAUD,
EUG. ROCHE.